(12) United States Patent
Yang

(10) Patent No.: US 11,077,375 B2
(45) Date of Patent: Aug. 3, 2021

(54) METHOD, APPARATUS, AND STORAGE MEDIUM FOR CONTROLLING VIRTUAL OBJECT TO INTERACT WITH VIRTUAL SCENE

(71) Applicant: TENCENT TECHNOLOGY (SHENZHEN) COMPANY LIMITED, Shenzhen (CN)

(72) Inventor: Jin Yang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/925,513

(22) Filed: Jul. 10, 2020

(65) Prior Publication Data

US 2020/0338452 A1    Oct. 29, 2020

Related U.S. Application Data

(63) Continuation of application No. PCT/CN2019/082371, filed on Apr. 12, 2019.

(30) Foreign Application Priority Data

May 24, 2018   (CN) .......................... 201810507875.9

(51) Int. Cl.
A63F 13/56       (2014.01)
(52) U.S. Cl.
CPC .................................. *A63F 13/56* (2014.09)
(58) Field of Classification Search
CPC ........................................................ A63F 13/56
See application file for complete search history.

(56) References Cited

FOREIGN PATENT DOCUMENTS

| CN | 104881127 A | 9/2015 |
|---|---|---|
| CN | 108671545 A | 10/2018 |
| JP | 2000153061 A | 6/2000 |

OTHER PUBLICATIONS

International Search Report with English translation and Written Opinion regarding PCT/CN2019/082371 dated Jul. 10, 2019, 10 pages.
Baidu Jingyuan: How to Turn off Automatic Door Opening in PlayerUnknown's Battlegrounds, https://jingyan.baidu.com/article/3ea5148989d7ef52e6lbba3d.html, with machine translation, Mar. 12, 2018, 8 pages.

*Primary Examiner* — Ronald Laneau
*Assistant Examiner* — Matthew D Hoel
(74) *Attorney, Agent, or Firm* — Brinks Gilson & Lione

(57) ABSTRACT

The present disclosure describes method, apparatus, and storage medium for controlling virtual object to interact with virtual scene. The method includes displaying a first interface of a virtual scene, the first interface comprising a virtual door in a closed state; controlling a virtual object to move in the virtual scene and enter a first area of the virtual door, the first area being an area allowing automatic opening of the virtual door; in response to a moving speed of the virtual object in a vertical direction being greater than a preset speed, and an angle between a direction that the virtual object directly faces and a plane of the virtual door being within a preset angle range, adjusting the virtual door from the closed state to an open state; and displaying a second interface of the virtual scene, the second interface comprising the virtual door in the open state.

20 Claims, 13 Drawing Sheets

A terminal displays a first interface of a virtual scene, the first interface including a virtual door in a closed state
201

The terminal controls the virtual object to move in the virtual scene and enter a second area of the virtual door, and displays an opening button of the virtual door
202

The terminal continues to control the virtual object to move in the virtual scene and enter a first area of the virtual door
203

The terminal adjusts the virtual door from the closed state to an open state in a case that a moving speed of the virtual object in a vertical direction of the virtual door is greater than a preset speed, and an angle between a direction that the virtual object directly faces and a plane in which the virtual door is within a preset angle range
204

The terminal displays a second interface of the virtual scene, the second interface including the virtual door in the open state
205

FIG. 2

A terminal displays a mode switching button of the virtual door in response to controlling a virtual object to enter a first area of a virtual door
901

The terminal switches, in response to detecting a selection operation on the mode switching button, the door opening mode from a current door opening mode to the other door opening mode
902

The terminal adjusts the virtual door from a closed state to an open state in a case that a moving speed of the virtual object in the vertical direction of the virtual door is greater than a preset speed, an angle between a direction that the virtual object directly faces and a plane in which the virtual door is located belongs to a preset angle range, and the current door opening mode is the automatic door opening mode
903

FIG. 9

METHOD, APPARATUS, AND STORAGE MEDIUM FOR CONTROLLING VIRTUAL OBJECT TO INTERACT WITH VIRTUAL SCENE

RELATED APPLICATION

This application is a continuation application of PCT Patent Application No. PCT/CN2019/082371, filed on Apr. 12, 2019, which claims priority to Chinese patent application No. 201810507875.9, filed with the China National Intellectual Property Administration on May 24, 2018, both of which are incorporated herein by reference in their entireties.

FIELD OF THE TECHNOLOGY

This application relates to the field of computer technologies, and in particular, to a method and apparatus for controlling a virtual object to interact with a virtual scene, a terminal, and a storage medium.

BACKGROUND OF THE DISCLOSURE

With the rapid development of computer technologies and the popularization of smart devices, video games have been widely used and have become one of the most commonly used entertainment methods. A user may set a virtual object in a video game and control the virtual object to interact with a virtual scene provided by the video game. To simulate a real scene more realistically, a virtual building and a virtual door in the virtual building may be set in the virtual scene, and the virtual object may perform an operation of opening the virtual door in the virtual building.

Usually, a terminal controls the virtual object to move in the virtual scene, and obtains a position of the virtual object in the virtual scene and positions of the virtual doors in the virtual scene. When determining that a distance between the position of the virtual object and a position of a virtual door is less than a preset distance, which means that the virtual object is located near the virtual door, the terminal provides an opening button of the virtual door on a display interface of the virtual scene. When detecting a selection operation on the opening button by the user, the terminal adjusts the virtual door from a closed state to an open state, to implement the operation of opening the virtual door.

In the implementation process of the embodiments of this application, at least the following problem exists in the related art: the user needs to manually select the opening button to open the virtual door, and this brings operating pressure to the user, resulting in low operation efficiency of the user.

SUMMARY

According to various embodiments provided in this application, a method and apparatus for controlling a virtual object to interact with a virtual scene, a terminal, and a storage medium are provided.

The present disclosure describes a method for controlling a virtual object to interact with a virtual scene. The method includes displaying, by a terminal, a first interface of a virtual scene, the first interface comprising a virtual door in a closed state. The terminal includes a memory storing instructions and a processor in communication with the memory. The method also includes controlling, by the terminal, a virtual object to move in the virtual scene and enter a first area of the virtual door, the first area being an area allowing automatic opening of the virtual door; in response to a moving speed of the virtual object in a vertical direction of the virtual door being greater than a preset speed, and an angle between a direction that the virtual object directly faces and a plane in which the virtual door is located being within a preset angle range, adjusting, by the terminal, the virtual door from the closed state to an open state; and displaying, by the terminal, a second interface of the virtual scene, the second interface comprising the virtual door in the open state.

The present disclosure describes an apparatus for controlling a virtual object to interact with a virtual scene. The apparatus includes a memory storing instructions; and a processor in communication with the memory. When the processor executes the instructions, the processor is configured to cause the apparatus to display a first interface of a virtual scene, the first interface comprising a virtual door in a closed state, control a virtual object to move in the virtual scene and enter a first area of the virtual door, the first area being an area allowing automatic opening of the virtual door, in response to a moving speed of the virtual object in a vertical direction of the virtual door being greater than a preset speed, and an angle between a direction that the virtual object directly faces and a plane in which the virtual door is located being within a preset angle range, adjust the virtual door from the closed state to an open state, and display a second interface of the virtual scene, the second interface comprising the virtual door in the open state.

The present disclosure describes a non-transitory computer readable storage medium storing computer-readable instructions. The computer readable instructions, when executed by a processor, are configured to cause the processor to perform displaying a first interface of a virtual scene, the first interface comprising a virtual door in a closed state; controlling a virtual object to move in the virtual scene and enter a first area of the virtual door, the first area being an area allowing automatic opening of the virtual door; in response to a moving speed of the virtual object in a vertical direction of the virtual door being greater than a preset speed, and an angle between a direction that the virtual object directly faces and a plane in which the virtual door is located being within a preset angle range, adjusting the virtual door from the closed state to an open state; and displaying a second interface of the virtual scene, the second interface comprising the virtual door in the open state.

According to another aspect, a terminal is provided, including a processor and a memory, the memory storing a computer-readable instruction, the computer-readable instruction, when executed by the processor, causing the processor to perform the following operations: displaying a first interface of a virtual scene, the first interface including a virtual door in a closed state; controlling a virtual object to move in the virtual scene and enter a first area of the virtual door, the first area being an area allowing automatic opening of the virtual door; adjusting the virtual door from the closed state to an open state in a case that a moving speed of the virtual object in a vertical direction of the virtual door is greater than a preset speed, and an angle between a direction that the virtual object directly faces and a plane in which the virtual door is located belongs to a preset angle range; and displaying a second interface of the virtual scene, the second interface including the virtual door in the open state, the preset angle range being an angle range greater than a first angle and less than a second angle, the first angle being less than 90 degrees, and the second angle being greater than 90 degrees and less than 180 degrees.

Details of one or more embodiments of this application are provided in the accompany drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from such accompanying drawings without creative efforts.

FIG. 2 is a flowchart of a method for controlling a virtual object to interact with a virtual scene according to an embodiment of this application.

FIG. 9 is a flowchart of another method for controlling a virtual object to interact with a virtual scene according to an embodiment of this application.

DESCRIPTION OF EMBODIMENTS

Figure 1:
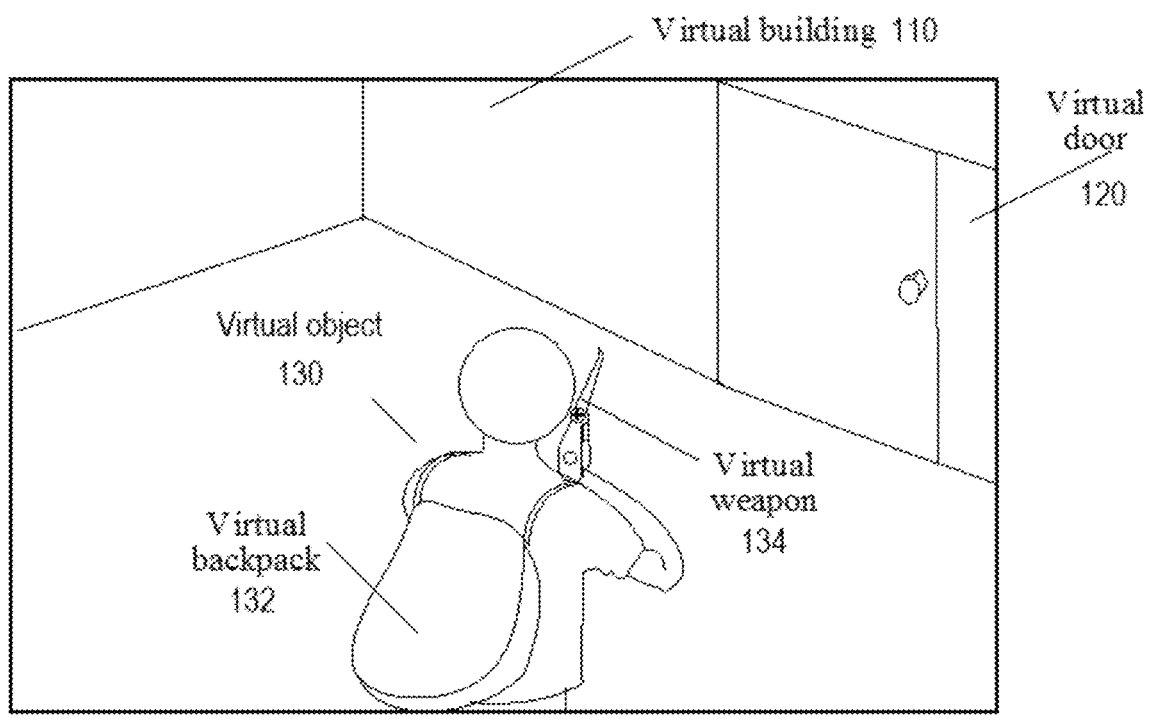
FIG. 1 is a schematic diagram of a display interface of a virtual scene according to an embodiment of this application.

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application. All other embodiments obtained by persons of ordinary skill in the art based on the embodiments of this application without creative efforts shall fall within the protection scope of this application.

The terms "include", "contain" and any other variants thereof in the specification, claims, and accompanying drawings of this application are intended to cover a non-exclusive inclusion, so that a process, a method, a system, a product, or a device that includes a series of units is not necessarily limited to those units, but may include other units not expressly listed or inherent to such a process, method, product, or device.

Throughout the specification and claims, terms may have nuanced meanings suggested or implied in context beyond an explicitly stated meaning Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

In addition, the accompanying drawings are only schematic illustrations of this application and are not necessarily drawn to scale. The same reference numbers in the drawings represent the same or similar parts, and therefore, repeated descriptions thereof are omitted. Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks and/or processor apparatuses and/or micro-controller apparatuses.

The embodiments of this application mainly relate to video games, for example, first-person shooter (FPS) games or real-time strategy (RTS) games. A terminal can download and install a configuration file of a video game, and the configuration file includes an application program, interface display data, or virtual scene data of the video game. When a user logs in to the video game on the terminal, the terminal renders and displays a virtual scene in the video game by invoking the configuration file. The user may perform a control operation on the terminal to control the virtual object to perform an operation in the virtual scene and interact with the virtual scene, and the terminal may render and display operation data for the user to view during the operation.

The virtual scene may be regarded as a virtual space, and used for simulating a real environment in reality. The virtual scene may be a two-dimensional virtual scene or a three-dimensional virtual scene. For example, the virtual scene may include the sky, the land, and the ocean, and the land may include environment elements such as a desert and cities. Certainly, the virtual scene may further include a virtual building, a virtual door provided in the virtual building, and a virtual item that may be picked up. The virtual scene may further be used for simulating a real environment under a different weather, for example, a sunny day, a rainy day, a foggy day, or a dark night.

The user may control a virtual object to move in the virtual scene, the virtual object may be a virtual image used for representing the user, and the virtual object may be in any form, such as a person or an animal. Using a shooting game as an example, in the virtual scene, the user may control the virtual object to fall freely, glide, or fall after a parachute is opened in the sky; or to run, jump, creep, stoop and move forward in the land; or control the virtual object to swim, float, or dive in the ocean. Certainly, the user may further control the virtual object to ride in a vehicle to move in the virtual scene. The user may further control the virtual object to enter or exit the virtual building and open the virtual door in the virtual scene, to discover and pick up the virtual item in the virtual scene, to fight against another virtual object through the virtual item that is picked up. For example, the virtual item may be a piece of clothing, a helmet, a body armor, a medical product, a cold weapon or hot weapon, or the like, or the virtual item may be a virtual item left by another virtual object that is eliminated.

As shown in FIG. 1, a terminal displays a display interface of a virtual scene, the display interface includes a virtual object 130, a virtual building 110, and a virtual door 120, and the virtual object 130 wears a virtual backpack 132 and a virtual weapon 134.

The embodiments of this application provide a method for controlling a virtual object to interact with a virtual scene, applied to a scenario where a terminal displays a virtual scene and a user controls a virtual object to perform an operation in the virtual scene. In this scenario, the virtual object may perform various operations such as picking up a virtual item and fighting against another virtual object. During the operation, opening or closing of the virtual door needs to be controlled by using a specific method.

In the related art, usually, the virtual door can only be opened when the user manually selects an opening button of the virtual door, and a solution for automatically opening the virtual door is not provided. In the embodiments of this application, the solution for automatically opening the virtual door is provided, and needs of the user to open and close the virtual door are comprehensively considered, thereby providing the user with more free choice spaces, and facilitating in choosing an opening mode of the virtual door according to a current specific condition by the user.

FIG. 2 is a flowchart of a method for controlling a virtual object to interact with a virtual scene according to an embodiment of this application. An execution subject of the method is a terminal, and the terminal may be a computer, a mobile phone, a tablet computer, or another device. Referring to FIG. 2, the method includes the following steps:

201: The terminal displays a first interface of a virtual scene, the first interface including a virtual door in a closed state.

This embodiment of this application is applied to a scenario where a virtual door is in a closed state, and a process of opening the virtual door is described. Therefore, in a process of controlling a virtual object to perform an operation in a virtual scene, the terminal displays a first interface of the virtual scene, the first interface including a virtual door in a closed state.

In an embodiment, the terminal displays only a virtual scene that is within a preset range of the virtual object, so that when the terminal displays the first interface of the virtual scene, the first interface includes a virtual door located within the preset range of the virtual object, and the virtual door is in a closed state. The preset range may be a viewing angle range of observing the virtual scene from a viewing angle of the virtual object, or may be a viewing angle range of observing the virtual scene from a viewing angle of a camera behind the virtual object.

202: The terminal controls the virtual object to move in the virtual scene and enter a second area of the virtual door, and displays an opening button of the virtual door.

In a process in which the virtual object performs the operation in the virtual scene, a user of the terminal may control the virtual object to move in the virtual scene, and the terminal may detect a position of the virtual object in the virtual scene according to the operation of controlling, by the user, the virtual object to move. Various virtual buildings are disposed in the virtual scene, and virtual rooms, virtual doors, and the like are disposed in the virtual buildings. A position of each virtual door in the virtual scene may be determined, and whether the user needs to open the virtual door is determined according to a relative position between the virtual object and the virtual door.

For ease of opening or closing the virtual door, a first area and a second area are set for the virtual door, where the first area is an area allowing automatic opening of the virtual door, the second area is an area allowing opening of the virtual door, and the second area is greater than the first area, that is, the first area is located within the second area. In a process in which the terminal controls the virtual object to move and gradually approach the virtual door, the virtual object enters the second area first, and enters the first area when continuously approaching the virtual door. The first area and the second area may be areas of various shapes such as circular areas and square areas near the virtual door.

Figure 3:
FIG. 3 is a schematic diagram of a first area and a second area according to an embodiment of this application.

Referring to FIG. 3, a rectangular first area 310 "trigger automatic door opening area" and a rectangular second area 320 "trigger door opening area" are set for the virtual door. The "trigger automatic door opening area" (first area 310) is located within the "trigger door opening area" (second area 320).

Therefore, in the process in which the terminal controls the virtual object to move in the virtual scene, the terminal determines, according to a first position of the virtual object in the virtual scene and a second position of the virtual door in the virtual scene, and a setting method of the first area and the second area, whether the virtual object enters the first area or the second area of the virtual door.

When it is determined that the virtual object enters the second area of the virtual door, the virtual door is allowed to be opened, and in this case, an opening button of the virtual door is displayed, where the opening button is used for triggering an operation of opening the virtual door. When the terminal detects a selection operation on the opening button, it means that the user intends to open the virtual door, so that the terminal adjusts a state of the virtual door from the closed state to an open state, and displays a second interface of the virtual scene, the second interface including the virtual door in the open state. When the terminal does not detect the selection operation on the opening button, the virtual door is kept closed. The selection operation may be the user's click operation on a start button on a touch screen configured by the terminal, or may be an operation of pressing a confirmation key on a keyboard by the user in a state in which the start button is selected by the terminal.

In an embodiment, a first area and a second area may be rectangular or square areas, so that the terminal determines four boundary lines in the first area and four boundary lines in the second area according to the second position of the virtual door in the virtual scene. When determining, according to the first position of the virtual object in the virtual scene, that the virtual object enters inside any boundary line of the second area, the terminal determines that the virtual object enters the second area. When determining, according to the first position of the virtual object in the virtual scene, that the virtual object enters inside any boundary line of the first area, the terminal determines that the virtual object enters the first area.

In another embodiment, a first area may be a circular area with the virtual door as its center and a first preset distance as its radius, a second area may be a circular area with the virtual door as the center and a second preset distance as the radius, and the second preset distance is greater than the first preset distance. The terminal may obtain the first position of the virtual object in the virtual scene and the second position of the virtual door in the virtual scene. When a distance between the first position and the second position is less than the first preset distance, the terminal determines that the virtual object enters the first area of the virtual door. When the distance between the first position and the second position is less than the second preset distance, the terminal determines that the virtual object enters the second area of the virtual door.

203: The terminal continues to control the virtual object to move in the virtual scene and enter a first area of the virtual door.

In this embodiment of this application, for example, the user does not select the start button in step 202, and the terminal continues to control the virtual object to move in the virtual scene. When the virtual object enters the first area of the virtual door, automatic opening of the virtual door is allowed. In this case, the terminal determines whether the virtual object satisfies a condition for automatically opening the virtual door, and if the condition is satisfied, the virtual door is automatically opened.

204: The terminal adjusts the virtual door from the closed state to an open state in a case that a moving speed of the virtual object in a vertical direction of the virtual door is greater than a preset speed, and an angle between a direction that the virtual object directly faces and a plane in which the virtual door is within a preset angle range.

In this embodiment of this application, considering that a person usually moves in a direction of approaching a door when opening the door, a moving speed is not excessively slow, and considering that the front of the head faces the door, an angle does not deviate too much. Taking analogy of the movement characteristics of a real living person to open a door, the condition for automatically opening the virtual door is set to include: a moving speed of the virtual object in the vertical direction of the virtual door is sufficiently large, and the virtual object faces the virtual door directly, for example, an angle between a direction that the virtual object directly faces and the virtual door is not excessively small or excessively large.

Therefore, when determining that the virtual object enters the first area of the virtual door, the terminal obtains a moving direction and a moving speed of the virtual object in the virtual scene, determines the vertical direction of the virtual door according to the position of the virtual door in the virtual scene, that is, "a direction through the virtual door", and obtains a moving speed of the virtual object in the vertical direction of the virtual door, to determine whether the moving speed at which the virtual object moves toward the virtual door is sufficiently large, for example, being greater than a preset speed. The terminal further obtains an angle between a direction that the virtual object directly faces and a plane in which the virtual door is located. When the angle between a direction that the virtual object directly faces and a plane in which the virtual door is located belongs to a preset angle range, it is considered that the virtual object directly faces the virtual door directly. When the angle between a direction that the virtual object directly faces and a plane in which the virtual door is located does not belong to the preset angle range, it is considered that the virtual object does not face the virtual door directly.

Therefore in a case that a moving speed of the virtual object in the vertical direction of the virtual door is greater than a preset speed, and an angle between a direction that the virtual object directly faces and a plane in which the virtual door is located belongs to a preset angle range, it is determined that the condition for automatically opening the virtual door is currently satisfied, and the terminal automatically switches a state of the virtual door from the closed state to the open state, so that the function of automatically opening the virtual door is implemented without the need to detect the user's selection operation on the opening button to open the door, thereby simplifying the user's operation.

The preset speed may be determined according to the general speed of a person passing through a door in actual life, or may be determined according to a walking speed of the virtual object disposed in the virtual scene. The preset angle range is an angle range greater than a first angle and less than a second angle, the first angle is less than 90 degrees, and the second angle is greater than 90 degrees and less than 180 degrees.

In another embodiment in a case that a moving speed of the virtual object in the vertical direction of the virtual door is not greater than a preset speed, or an angle between a direction that the virtual object directly faces and a plane in which the virtual door is located does not belong to a preset angle range, the terminal keeps the virtual door closed and does not automatically open the virtual door.

Figure 4:
FIG. 4 is a schematic diagram of a virtual object and a virtual door according to an embodiment of this application.

Referring to FIG. 4, the virtual object has entered the first area of the virtual door, so that the opening button 410 is displayed on the display interface. However, the virtual object currently does not have any moving speed, so that the terminal determines that the condition for automatically opening the virtual door is currently not satisfied, and the virtual door will not be automatically opened.

Figure 5:
FIG. 5 is a schematic diagram of a virtual object and a virtual door according to an embodiment of this application.

Referring to FIG. 5, the virtual object has entered the first area of the virtual door, so that the opening button 410 is displayed on the display interface. However, the virtual object is currently moving to the right, and there is no speed component in the vertical direction of the virtual door, so that the terminal determines that the condition for automatically opening the virtual door is currently not satisfied, and the virtual door will not be automatically opened.

Figure 6:
FIG. 6 is a schematic diagram of a preset angle range according to an embodiment of this application.

Referring to FIG. 6, a straight line AB represents a plane in which the virtual door is located, P is a middle point of the virtual door, an angle between a line segment PA and a straight line (PC) on the left side of a line segment PQ is a first angle 610, an angle between the line segment PA and a straight line (PD) on the right side of the line segment PQ is a second angle 620, and a direction that Q points to P in the line segment PQ is a direction that the virtual object directly faces. When the line segment PQ is in a range between the left straight line and the right straight line, it means that an angle between the direction that the virtual object directly faces (the direction that Q points to P) and the direction of the plane in which the virtual door is located (the straight line AB) belongs to a preset angle range (i.e, between the first angle 610 and the second angle 620, inclusive), and it may be considered that the virtual object directly faces the virtual door.

Figure 7:
FIG. 7 is a schematic diagram of a virtual object and a virtual door according to an embodiment of this application.

Referring to FIG. 7, the virtual object has entered the first area of the virtual door, so that the opening button 410 is displayed on the display interface. However, the virtual object is currently moving sideways in the direction of the virtual door, and does not directly face the virtual door, so that the terminal determines that the condition for automatically opening the virtual door is currently not satisfied, and the virtual door will not be automatically opened.

205: The terminal displays a second interface of the virtual scene, the second interface including the virtual door in the open state.

After adjusting the state of the virtual door, the terminal displays the second interface of the virtual scene, the second interface including the virtual door in the open state. The user may determine that the virtual door is in the open state by viewing the second interface.

By setting the foregoing condition for automatically opening the virtual door, the movement characteristics of a person passing through a door in actual life may be simulated, making the door opening operation more realistic and vivid. Moreover, the user's needs may be analyzed according to the foregoing condition, and the virtual door is automatically opened according to the user's needs, so that unnecessary door opening operations by the user are simplified, thereby reducing operating pressure and improving operating efficiency, and the virtual door is prevented from being automatically opened when the virtual object is performing an operation such as a fight near the virtual door, thereby preventing interference with the user's fighting action.

In the method provided in this embodiment of this application, a first interface of a virtual scene is displayed, the first interface including a virtual door in a closed state; a virtual object is controlled to move in the virtual scene and enter a first area of the virtual door; the virtual door is adjusted from the closed state to an open state in a case that a moving speed of the virtual object in the vertical direction of the virtual door is greater than a preset speed, and an angle between a direction that the virtual object directly faces and a plane in which the virtual door is located belongs to a preset angle range; and a second interface of the virtual scene is displayed, the second interface including the virtual door in the open state. This embodiment of this application provides a method for automatically opening the virtual door, and a condition for automatically opening the virtual door is set to be that: a moving speed of the virtual object in the vertical direction of the virtual door is greater than a preset speed, and an angle between a direction that the virtual object directly faces and a plane in which the virtual door is located belongs to a preset angle range. Whether to automatically open the virtual door is controlled according to this condition, and the user's needs may be analyzed according to the movement characteristics of the virtual object, so that the operation of manually selecting the opening button by the user is simplified when the user needs to automatically open the virtual door, thereby reducing operating pressure and improving operating efficiency, and the virtual door is kept closed when the user does not need to automatically open the virtual door, thereby avoiding interference with the user's fighting action and improving flexibility and interactivity.

Figure 8:
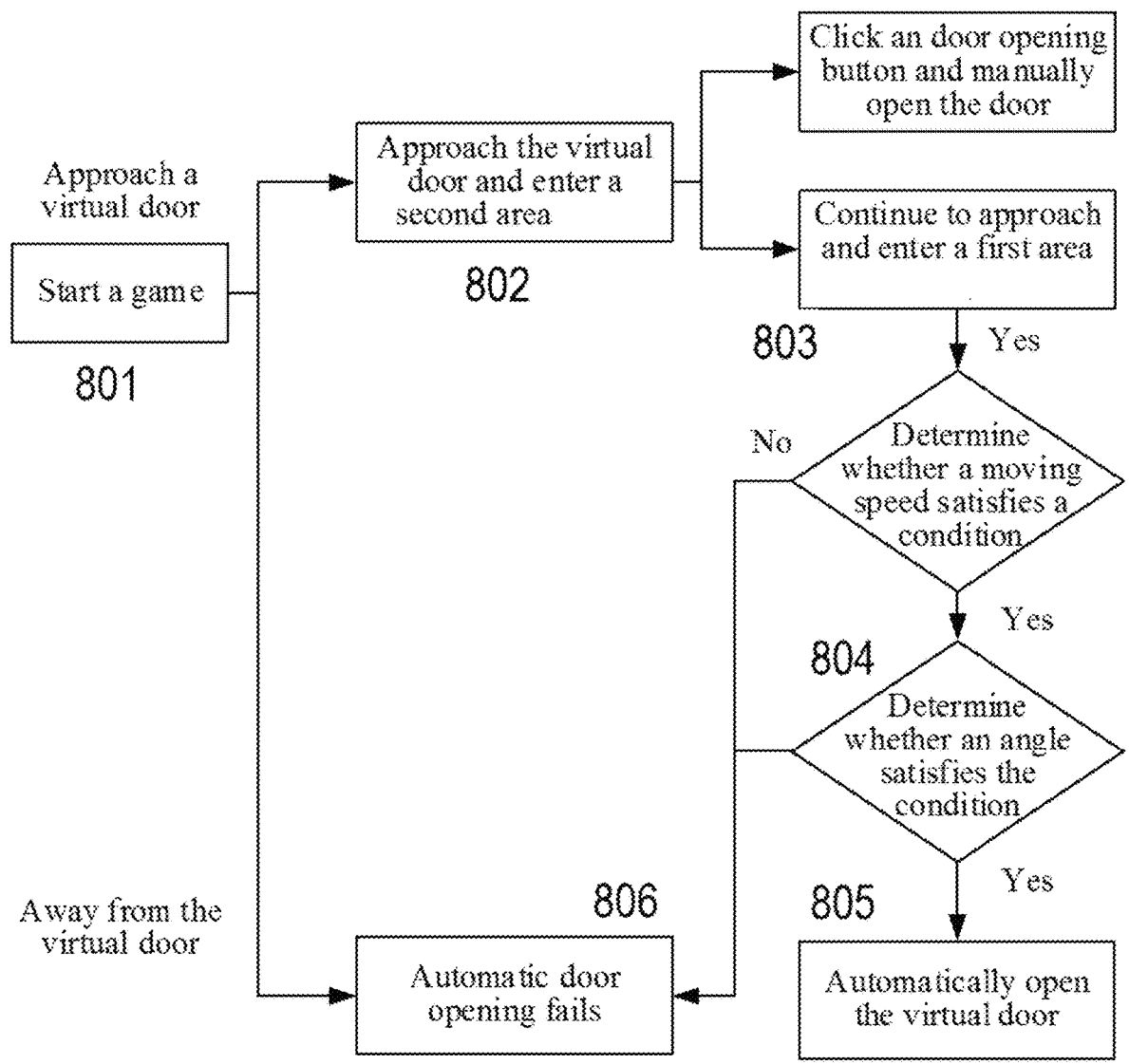
FIG. 8 is a schematic diagram of a user operation process according to an embodiment of this application.

FIG. 8 is a schematic diagram of a user operation process according to an embodiment of this application. Referring to FIG. 8, using a video game scene as an example, the operation process includes the following steps:

801: A user uses a terminal to open a video game, control a virtual object to enter a virtual scene provided by the video game, start the game, and control the virtual object to move in the virtual scene during the game.

802: The virtual object approaches a virtual door and enters a second area of the virtual door, and in this case, the terminal displays a door opening button. The user may open the virtual door after clicking the door opening button, or the user does not click the door opening button but performs the following step 803.

803: The virtual object continues to approach the virtual door and enters a first area of the virtual door, and determine whether a moving speed of the virtual object in the vertical direction of the virtual door is greater than a preset speed. If yes, the following step 804 is performed. If not, automatic opening of the door fails.

804: Determine whether an angle between a direction that the virtual object directly faces and a plane in which the virtual door is located is within a specified angle range. If yes (at 805), the virtual door is automatically opened. If not (at 806), automatic opening of the door fails.

Based on the foregoing embodiment shown in FIG. 2, an embodiment of this application further provides another method for controlling a virtual object to interact with a virtual scene. According to the method, enabling or disabling of an automatic door opening mode and a manual door opening mode can be controlled. In the automatic door opening mode, automatic opening of the virtual door is allowed, while in the manual door opening mode, automatic opening of the virtual door is not allowed. FIG. 9 is a flowchart of another method for controlling a virtual object to interact with a virtual scene according to an embodiment of this application. An execution body of the method is a terminal. Referring to FIG. 9, the method includes the following steps:

901: The terminal displays a mode switching button of the virtual door in response to controlling a virtual object to enter a first area of a virtual door.

In this embodiment of this application, two door opening modes are set, including an automatic door opening mode and a manual door opening mode. The automatic door opening mode is a mode allowing automatic opening of the virtual door, the manual door opening mode is a mode in which automatic opening of the virtual door is not allowed, and an opening button can only be manually selected by the user to open the virtual door. When the virtual object enters the first area of the virtual door, the terminal displays a mode switching button of the virtual door, the mode switch button being used for switching the door opening mode. The user may trigger a selection operation on the mode switching button, to switch the door opening mode.

In an embodiment, the mode switching button may display a current door opening mode for the user to view. For example, referring to FIG. 4, FIG. 5, and FIG. 7, when the virtual object enters the first area of the virtual door, the mode switching button and the door opening button are displayed, and a current door opening mode "auto" or "automatic" 420 is displayed on the mode switching button.

902: The terminal switches, in response to detecting a selection operation on the mode switching button, the door opening mode from a current door opening mode to the other door opening mode.

In an embodiment, in a case that the terminal has enabled the automatic door opening mode, when the selection operation on the mode switching button is detected, the door opening mode is switched to the manual door opening mode. In this case, a current manual opening mode may be displayed on the mode switching button.

In another embodiment, in a case that the terminal disables the automatic door opening mode, when the selection operation on the mode switching button is detected, the door opening mode is switched to the automatic door opening mode.

Step 902 is an optional step. The terminal may alternatively not perform step 902.

903: The terminal adjusts the virtual door from a closed state to an open state in a case that a moving speed of the virtual object in the vertical direction of the virtual door is greater than a preset speed, an angle between a direction that the virtual object directly faces and a plane in which the virtual door is located belongs to a preset angle range, and the current door opening mode is the automatic door opening mode.

In the automatic door opening mode, the terminal may determine whether the virtual object satisfies the condition for automatically opening the virtual door. If the condition is satisfied, the virtual door is opened. If the condition is not satisfied, the virtual door is not opened. In another embodiment, in the manual door opening mode, the terminal does not automatically open the virtual door, but opens the virtual door only when detecting the user's selection operation on the door opening button.

In an embodiment, when the terminal is in the automatic door opening mode, a time period may be reserved for the user, and whether the virtual object satisfies the condition for automatically opening the virtual door may be determined within the reserved time period, but the virtual door is not automatically opened. During this time period, the user may consider whether to select the mode switching button. During this time period, if the user triggers the selection operation on the mode switching button, the terminal is switched to the manual door opening mode, and the virtual door is not automatically opened. In a case that the user does not trigger the selection operation on the mode switching button during this time period, after the time period ends, and when the virtual object satisfies the condition for automatically opening the virtual door, the terminal automatically opens the virtual door.

In this embodiment of this application, description is made merely by using an example in which the mode switching button of the virtual door is directly displayed when the virtual object enters the first area of the virtual door. However, in another embodiment, the terminal may display the mode switching button only under a specific condition, for the user to switch the door opening mode through the mode switching button, and no longer display the mode switching button under other conditions, thereby controlling whether to enable the permission to switch the door opening mode through the mode switching button.

For example, the terminal displays a setting interface, and displays a specified button in the setting interface for the user to turn on or turn off the specified button. The automatic door opening mode and the permission to switch the door opening mode through the mode switching button are enabled in a case that the specified button is turned on; and the automatic door opening mode and the permission to switch the door opening mode through the mode switching button are disabled in a case that the specified button is turned off.

Therefore, the foregoing step 901 further includes: when determining that the virtual object enters the first area of the virtual door, the terminal does not immediately display the mode switching button of the virtual door, but determines whether the specified button in the setting interface has been turned on. The terminal displays the mode switching button of the virtual door only when determining that the specified button in the setting interface is turned on, to allow the user to switch the door opening mode through the mode switching button.

The user may open the setting interface before the game starts, and turn on or turn off the specified button in the setting interface, or the user may exit the display interface of the game during the game, open the setting interface, and turn on or turn off the specified button in the setting interface.

Figure 10:
FIG. 10 is a schematic diagram of a setting interface according to an embodiment of this application.

Referring to FIG. 10, the setting interface includes various function buttons. When an "automatic door opening" button is turned on, the virtual door may be automatically opened, and the mode switching button is displayed when the virtual object approaches the virtual door. When the "automatic door opening" button 1010 is turned off, the mode switching button will not be displayed and the virtual door will not be automatically opened even if the virtual object approaches the virtual door.

In addition, for some survival video games, a total game duration is fixed. In the early stage of the game, most of the virtual objects are picking up virtual items, and in this case, the virtual door needs to be quickly opened. In the middle stage of the game, some virtual objects are picking up virtual items, and some virtual objects are fighting against other virtual objects. In the later stage of the game, most of the virtual objects are fighting against other virtual objects, and in this case, offensive and defensive strategies/operations need to be performed near the virtual door, and the virtual door does not need to be opened automatically.

In view of the foregoing characteristics, in this embodiment of this application, the door opening mode and the permission to switch the door opening mode through the mode switching button may be set according to different stages to which different time points belong, and this specifically includes the following steps:

1. Enable, in a case that a current time point is in a first time period, the automatic door opening mode and the permission to switch the door opening mode through the mode switching button.

In this embodiment of this application, this operation process may be divided into a first time period, a second time period, and a third time period. The first time period is a time period of a first preset duration after a start time point of this operation process, the third time period is a time period of a second preset duration before an end time point of this operation process, and the second time period is a time period between the first time period and the third time period. For example, if the game duration is 40 minutes, the first 10 minutes in 40 minutes belong to the first time period, the last 10 minutes belong to the third time period, and the middle 20 minutes belong to the second time period.

The first time period is the early stage of this operation process. In this time period, the automatic door opening mode is directly enabled, and the permission to switch the door opening mode through the mode switching button is enabled. Each time the virtual object approaches the virtual door, whether to automatically open the virtual door may be controlled according to whether the virtual object satisfies the condition for automatically opening the virtual door in the automatic door opening mode, or the door opening mode may be switched through the mode switching button. Control does not need to be performed according to an on/off state of the specified button.

2. Control, in a case that a current time point is in a second time period, to enable or disable the automatic door opening mode according to an on/off state of the specified button, and switch between enabling and disabling of the permission to switch the door opening mode through the mode switching button.

The second time period is the middle stage of this operation process. During this time period, control is performed according to the on/off state of the specified button.

3. Disable, in a case that a current time point is in a third time period, the automatic door opening mode and the permission to switch the door opening mode through the mode switching button.

The third time period is the later stage of this operation process. During this time period, to avoid interference with the fight between the virtual objects, the automatic door opening mode is disabled, the manual door opening mode is enabled, and the permission to switch the door opening mode through the mode switching button is disabled, so that even if the virtual object enters the first area of the virtual door, the terminal no longer displays the mode switching button, but displays only the opening button, and then the user may manually select the opening button to open the virtual door according to needs.

When displaying the setting interface, the terminal may display a smart button in addition to the specified button. After the user turns on the smart button, the terminal may use the foregoing method to set the door opening mode and the permission to switch the door opening mode through the mode switching button according to a stage to which a current time point belongs. When the user turns off the smart button, the terminal performs control according to the on/off state of the specified button.

In an embodiment, only one specified button may be displayed in the setting interface, and the specified button is applicable to all virtual doors in the virtual scene. Alternatively, the terminal may determine all virtual doors in a virtual building in which the virtual object is located, and dispose, in the setting interface, a specified button for each virtual door in the virtual building in which the virtual object is located, specified buttons of all virtual doors being turned on by default. In this case, the user may manually turn off the specified buttons of some virtual doors, thereby implementing differentiated settings for different virtual doors in a virtual building, and improving the flexibility.

According to the method provided in this embodiment of this application, two door opening modes: the automatic door opening mode and the manual door opening mode are set. The user may turn on or turn off the specified button in the setting interface to determine the door opening mode, or switch the door opening mode through the mode switching button, to determine the door opening mode according to needs, thereby improving the flexibility.

In addition, different setting methods are used at different stages to provide automatic door opening functions with different opening degrees, so that the user has more choices. Moreover, a specified button is disposed in the setting interface for each virtual door in the virtual building in which the virtual object is located, thereby implementing differentiated settings for different virtual doors in a virtual building, facilitating in setting by the user, and further improving the flexibility.

Video games in the related art do not provide the user with the automatic door opening function, and the user has to manually select a door opening button to open the virtual door. At present, game rhythm of video games is becoming increasingly fast. Frequent and monotonous door opening operations undoubtedly bring operating pressure and burden to the user, consequently greatly increasing the user's operating costs, slowing down the user's efficiency in searching for virtual items, slowing down the overall game rhythm, resulting in bad game experience, and reducing the user's game interest.

Even if the user is provided with the automatic door opening function, if a designed condition for automatically opening a door is excessively broad and not sufficiently rigorous, the user cannot accurately perform tactical operations related to the virtual door such as approaching the door, avoiding the door, and opening the door to shoot in a fight, and consequently cannot achieve the tactical goal. In the long run, the user may feel tired and lose the fun of the game, resulting in the loss of user volume. In addition, it is impossible to determine the situation of a current fight and the situation of searching for virtual items of the user, and consequently it is impossible to understand the user's real needs.

In this embodiment of this application, the following methods are mainly used:

1. Whether to activate an automatic door opening function is first determined according to a relative position between a virtual object and a virtual door. If the virtual object does not enter an automatic door opening area, the door will not be automatically opened.

2. After the virtual object enters the automatic door opening area, a relative angle between a direction that the virtual object directly faces and a horizontal line of a door frame is further detected, and a next detection is performed only when the angle belongs to a specific angle range, thereby eliminating the user's tactical actions and ensuring that the virtual door is opened under a suitable condition.

3. It is also required that a moving speed of the virtual object has a sufficiently large speed component in a direction perpendicular to the virtual door, and the virtual object moves toward the virtual door.

4. In addition, a mode switching button is disposed beside a door opening button, and a specified button is further disposed in a setting interface. The user may switch the door opening mode at any time through the mode switching button in the game, and may also turn on or turn off the specified button in the setting interface. Such a design ensures the user's game experience of automatically opening the door, as well as gives the user enough freedom to choose, thereby facilitating in choosing a door opening mode according to a current specific condition by a player.

By using such methods, the user is provided with a smooth and rigorous automatic door opening function, and the door may be automatically opened according to actual needs of the user, thereby improving the user's efficiency in searching for materials in the game, reducing the user's non-essential operations, lowering the user's operating threshold, greatly reducing the user's operating pressure, reducing the user's learning costs, improving the strategy and interactivity, controlling the game rhythm within a reasonable range, and minimizing the impact on the user's tactical actions. A process of a fight of the user will not be interfered with, and the user may safely open the automatic door opening function, thereby further improving the strategy and operability of the game, and allowing the user to have more choices in the game.

It is to be understood that, the steps of the embodiments of this application are not necessarily performed according to a sequence indicated by step numbers. Unless explicitly specified in this application, the sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Such sub-steps or stages are not necessarily performed in sequence, but may be performed in turn or alternately with at least some of other steps or sub-steps or stages of the other steps.

In an embodiment, a terminal is further provided, including an apparatus for controlling a virtual object to interact with a virtual scene. The apparatus for controlling a virtual object to interact with a virtual scene includes various modules, and each module may be completely or partially implemented by using software, hardware, or a combination thereof.

Figure 11:
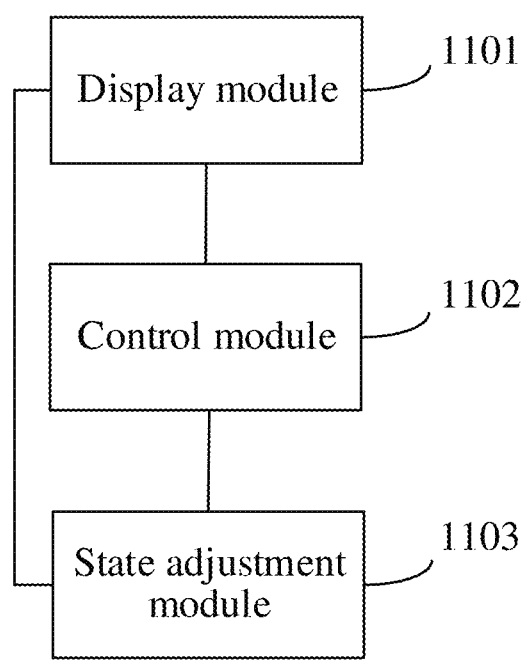
FIG. 11 is a schematic structural diagram of an apparatus for controlling a virtual object to interact with a virtual scene according to an embodiment of this application.

FIG. 11 is a schematic structural diagram of an apparatus for controlling a virtual object to interact with a virtual scene according to an embodiment of this application. Referring to FIG. 11, the apparatus is applied to a terminal and includes:

a display module 1101, configured to perform the step of displaying a first interface of a virtual scene in the foregoing embodiment;

a control module 1102, configured to perform the step of controlling a virtual object to move in the virtual scene and enter a first area of the virtual door in the foregoing embodiment; and a state adjustment module 1103, configured to perform the step of adjusting the virtual door from the closed state to an open state in a case that a condition for automatically opening the virtual door is satisfied in the foregoing embodiment, the display module 1101 being further configured to perform the step of displaying a second interface of the virtual scene in the foregoing embodiment.

In an embodiment, the apparatus further includes:

the display module 1101 being further configured to perform the step of displaying a mode switching button of the virtual door in response to controlling the virtual object to enter the first area of the virtual door in the foregoing embodiment; and a mode switching module, configured to perform the step of switching, in response to detecting a selection operation on the mode switching button, the door opening mode from a current door opening mode to the other door opening mode in the foregoing embodiment.

In an embodiment, the state adjustment module 1103 is further configured to perform the step of adjusting the virtual door from the closed state to the open state in a case that the moving speed is greater than the preset speed, the angle belongs to the preset angle range, and the current door opening mode is the automatic door opening mode in the foregoing embodiment.

In an embodiment, the display module 1101 is further configured to perform the step of displaying the mode switching button of the virtual door in response to controlling the virtual object to enter the first area of the virtual door and turning on a specified button in a setting interface in the foregoing embodiment.

In an embodiment, the apparatus further includes:

a first control module, configured to perform the step of enabling, in a case that a current time point is in a first time period, the automatic door opening mode and the permission to switch the door opening mode through the mode switching button in the foregoing embodiment;

a second control module, configured to perform the step of controlling, in a case that a current time point is in a second time period, to enable or disable the automatic door opening mode according to an on/off state of the specified button, and switching between enabling and disabling of the permission to switch the door opening mode through the mode switching button; and a third control module, configured to perform the step of disabling, in a case that a current time point is in a third time period, the automatic door opening mode and the permission to switch the door opening mode through the mode switching button in the foregoing embodiment.

In an embodiment, the apparatus further includes:

the control module 1102 being further configured to perform the step of controlling the virtual object to move in the virtual scene and enter a second area of the virtual door in the foregoing embodiment, the display module 1101 being further configured to perform the step of displaying an opening button of the virtual door in the foregoing embodiment, the state adjustment module 1103 being further configured to perform the step of adjusting, in response to detecting a selection operation on the opening button, the virtual door from the closed state to the open state in the foregoing embodiment, and the display module 1101 being further configured to perform the step of displaying the second interface of the virtual scene in the foregoing embodiment.

When the apparatus for controlling a virtual object to interact with a virtual scene provided in the foregoing embodiment controls the virtual object to interact with the virtual scene, only division of the foregoing function modules is used as an example for description. In the practical application, the functions may be allocated to and completed by different function modules according to requirements. That is, an internal structure of the terminal is divided into different function modules, to complete all or some of the functions described above. In addition, the apparatus for controlling a virtual object to interact with a virtual scene provided in the foregoing embodiment and the method embodiment for controlling a virtual object to interact with a virtual scene belong to the same concept. For a specific implementation process of the apparatus, refer to the method embodiment for details. Details are not described herein again.

Figure 12:
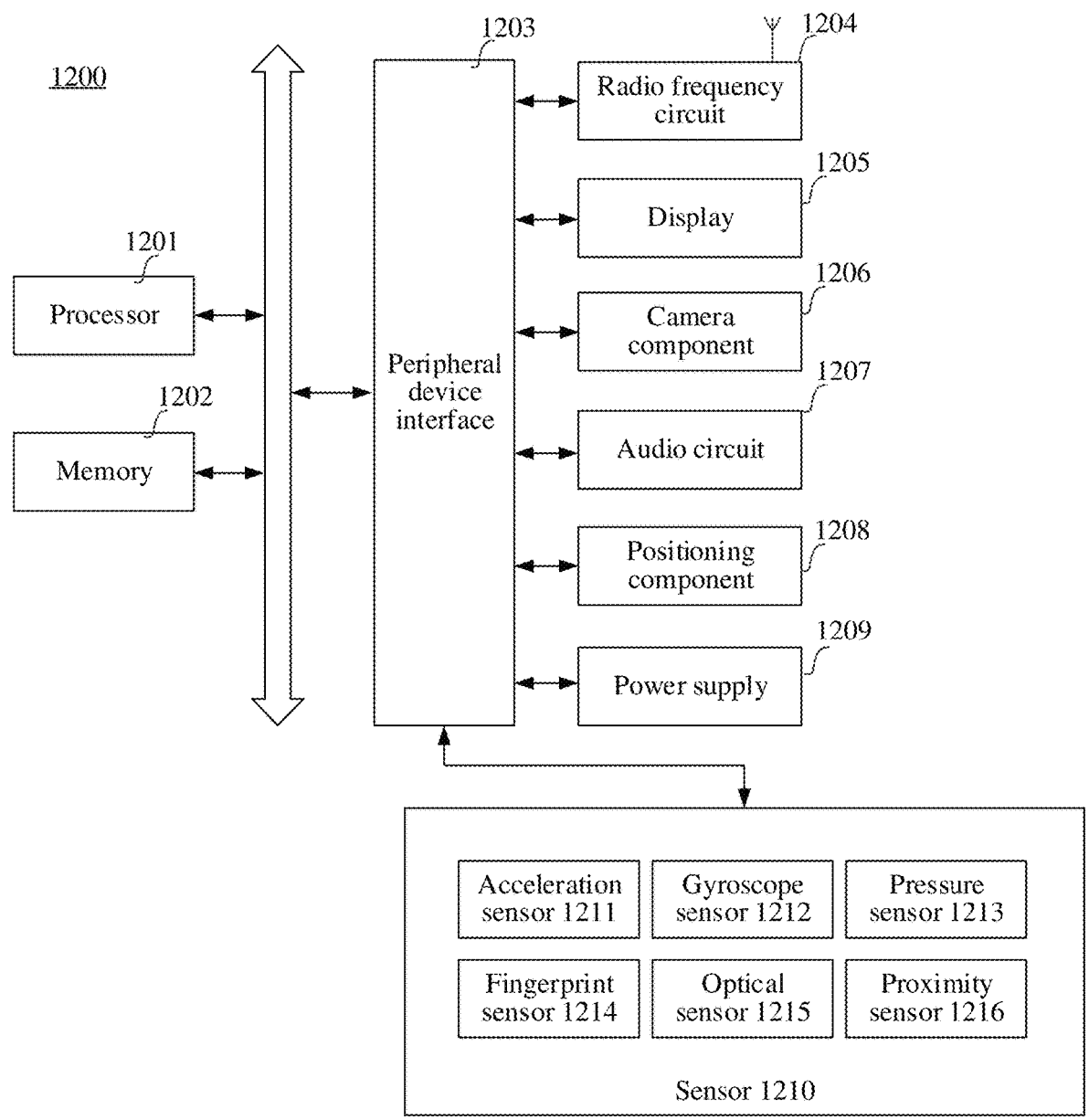
FIG. 12 is a schematic structural diagram of a terminal according to an embodiment of this application.

FIG. 12 shows a structural block diagram of a terminal 1200 according to an exemplary embodiment of this application. The terminal 1200 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be referred to as another name such as a user device, a portable terminal, a laptop terminal, or a desktop terminal.

Generally, the terminal 1200 includes a processor 1201 and a memory 1202.

The processor 1201 may include one or more processing cores, for example, a 4-core processor or a 5-core processor. The processor 1201 may be implemented in at least one hardware form of digital signal processing (DSP), a field programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is configured to be responsible for rendering and drawing content that a display needs to display. In some embodiments, the processor 1201 may further include an artificial intelligence (AI) processor. The AI processor is configured to process a computing operation related to machine learning.

The memory 1202 may include one or more computer-readable storage media. The computer-readable storage medium tangible may be non-transient. The memory 1202 may further include a high-speed random access memory and a nonvolatile memory, for example, one or more disk storage devices, or flash memory devices. In some embodiments, the non-transient computer-readable storage medium in the memory 1202 is configured to store at least one instruction. The at least one instruction is executed by the processor 1201 to implement the method for controlling a virtual object to interact with a virtual scene provided in the method embodiment in this application.

In some embodiments, the terminal 1200 may further optionally include a peripheral device interface 1203 and at least one peripheral device. The processor 1201, the memory 1202 and the peripheral device interface 1203 may be connected by a bus or a signal line. Each peripheral device may be connected to the peripheral device interface 1203 by the bus, the signal line, or a circuit board. Specifically, the peripheral device include: at least one of a radio frequency circuit 1204, a touch display 1205, a camera 1206, an audio circuit 1207, a positioning component 1208, and a power source 1209.

The peripheral device interface 1203 may be configured to connect input/output (I/O) related at least one peripheral device to the processor 1201 and the memory 1202. In some embodiments, the processor 1201, the memory 1202 and the peripheral device interface 1203 are integrated on a same chip or circuit board. In other some embodiments, any one or both of the processor 1201, the memory 1202, and the peripheral device interface 1203 may be implemented on a single chip or the circuit board. This is not limited in this embodiment.

The radio frequency circuit 1204 is configured to receive and transmit a radio frequency (RF) signal, which is also referred to as an electromagnetic signal. The RF circuit 1204 communicates with a communications network and other communications devices by using the electromagnetic signal. The RF circuit 1204 converts an electrical signal into the electromagnetic signal to send, or converts a received electromagnetic signal into the electrical signal. In an embodiment, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with other terminals through at least one wireless communication protocol. The wireless communication protocol includes, but is not limited to, a metropolitan area network, generations of mobile communications networks (2G, 3G, 4G, and 5G), a wireless local area network, and/or a wireless fidelity (Wi-Fi) network. In some embodiments, the RF circuit 1204 may also include a circuit related to near field communication (NFC). This is not limited in this application.

The display 1205 is configured to display a user interface (UI). The UI may include a graphic, a text, an icon, a video, and any combination thereof. When the display 1205 is the touch display, the display 1205 also has the capability to collect a touch signal on or above a surface of the display 1205. The touch signal may be inputted to the processor 1201 for processing as a control signal. In this case, the display 1205 may be further configured to provide a virtual button and/or a virtual keyboard, which is also referred to as a soft button and/or a soft keyboard. In some embodiments, there may be one display 1205, disposed on a front panel of the terminal 1200. In other some embodiments, there may be at least two displays 1205, disposed on different surfaces of the terminal 1200 respectively or in a folded design. In still other embodiments, the display 1205 may be a flexible display, disposed on a curved surface or a folded surface of the terminal 1200. Even, the display 1205 may be further set in a non-rectangular irregular pattern, namely, a special-shaped screen. The display 1205 may be configured by using materials such as a liquid crystal display (LCD), an organic light-emitting diode (OLED), or the like.

The camera component 1206 is configured to collect an image or a video. In an embodiment, the camera component 1206 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 1206 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1207 may include a microphone and a speaker. The microphone is configured to collect a sound wave of a user and an environment, and convert the sound wave into the electrical signal to input to the processor 1201 for processing, or to input to the radio frequency circuit 1204 for implementing voice communication. For stereo collection or noise reduction, there may be a plurality of microphones, disposed at different portions of the terminal 1200 respectively. The microphone may further be an array microphone or an omni-directional collection type microphone. The speaker is configured to convert the electrical signal from the processor 1201 or the radio frequency circuit 1204 into the sound wave. The speaker may be a conventional film speaker, or may be a piezoelectric ceramic speaker. When the speaker is the piezoelectric ceramic speaker, not only the electric signal can be converted into a sound wave audible to a human being, but also the electric signal can be converted into a sound wave inaudible to the human being for ranging and the like. In some embodiments, the audio circuit 1207 may also include an earphone jack.

The positioning component 1208 is configured to position a current geographic location of the terminal 1200 for implementing navigation or a location based service (LBS). The positioning component 1208 may be a positioning component based on a global positioning system (GPS) of the United States, a COMPASS System of China, a GLONASS System of Russia, or a GALILEO System of the European Union.

The power source 1209 is configured to supply power for various components in the terminal 1200. The power source 1209 may be an alternating current, a direct current, a disposable battery, or a rechargeable battery. When the power source 1209 includes the rechargeable battery, the rechargeable battery may be a wired rechargeable battery or a wireless rechargeable battery. The rechargeable battery may be further configured to support a fast charge technology.

In some embodiments, the terminal 1200 may also include one or more sensors 1210. The one or more sensors 1210 include, but are not limited to: an acceleration sensor 1211, a gyro sensor 1212, a pressure sensor 1213, a fingerprint sensor 1214, an optical sensor 1215, and a proximity sensor 1216.

The acceleration sensor 1211 may detect the magnitude of acceleration on three coordinate axes of a coordinate system established with the terminal 1200. For example, the acceleration sensor 1211 may be configured to detect a component of gravity acceleration on the three coordinate axes. The processor 1201 may control, according to a gravity acceleration signal collected by the acceleration sensor 1211, the touch display 1205 to display the user interface in a transverse view or a longitudinal view. The acceleration sensor 1211 may be further configured to collect game or user motion data.

The gyro sensor 1212 may detect a body direction and a rotation angle of the terminal 1200. The gyro sensor 1212 may cooperate with the acceleration sensor 1211 to collect 3D action by the user on the terminal 1200. The processor 1201 may implement the following functions according to the data collected by the gyro sensor 1212: motion sensing (such as changing the UI according to a tilt operation of the user), image stabilization at shooting, game control, and inertial navigation.

The pressure sensor 1213 may be disposed at a side frame of the terminal 1200 and/or a lower layer of the touch display 1205. When the pressure sensor 1213 is disposed on the side frame of the terminal 1200, a holding signal of the user to the terminal 1200 may be detected, and left/right hand identification and a quick action may be performed by the processor 1201 according to the holding signal collected by the pressure sensor 1213. When the pressure sensor 1213 is disposed on the lower layer of the touch display 1205, the processor 1201 controls an operable control on the UI interface according to a pressure operation of the user on the touch display 1205. The operable control includes at least one of a button control, a scroll-bar control, an icon control and a menu control.

The fingerprint sensor 1214 is configured to collect a user's fingerprint, and the processor 1201 identifies a user's identity according to the fingerprint collected by the fingerprint sensor 1214, or the fingerprint sensor 1214 identifies a user's identity according to the collected fingerprint. When the identity of the user is identified as a trusted identity, the processor 1201 authorizes the user to perform a related sensitive operation. The sensitive operation includes unlocking a screen, viewing encrypted information, downloading software, payment, changing settings, and the like. The fingerprint sensor 1214 may be disposed on a front surface, a back surface, or a side surface of the terminal 1200. When a physical button or a vendor logo is disposed on the terminal 1200, the fingerprint sensor 1214 may be integrated with the physical button or the vendor logo.

The optical sensor 1215 is configured to collect ambient light intensity. In an embodiment, the processor 1201 may control the display brightness of the touch display 1205 according to the ambient light intensity collected by the optical sensor 1215. Specifically, when the ambient light intensity is relatively high, the display brightness of the touch display 1205 is turned up. When the ambient light intensity is relatively low, the display brightness of the touch display 1205 is turned down. In another embodiment, the processor 1201 may further dynamically adjust a camera parameter of the camera component 1206 according to the ambient light intensity collected by the optical sensor 1215.

The proximity sensor 1216, also referred to as a distance sensor, is generally disposed on the front panel of the terminal 1200. The proximity sensor 1216 is configured to collect a distance between the user and the front surface of the terminal 1200. In an embodiment, when the proximity sensor 1216 detects that the distance between the user and the front surface of the terminal 1200 gradually becomes small, the touch display 1205 is controlled by the processor 1201 to switch from a bright screen state to a on-screen state. When the proximity sensor 1216 detects that the distance between the user and the front surface of the terminal 1200 gradually becomes large, the touch display 1205 is controlled by the processor 1201 to switch from the on-screen state to the bright screen state.

A person skilled in the art may understand that a structure shown in FIG. 12 constitutes no limitation on the terminal 1200, and the terminal may include more or fewer components than those shown in the figure, or some components may be combined, or a different component deployment may be used.

Figure 13:
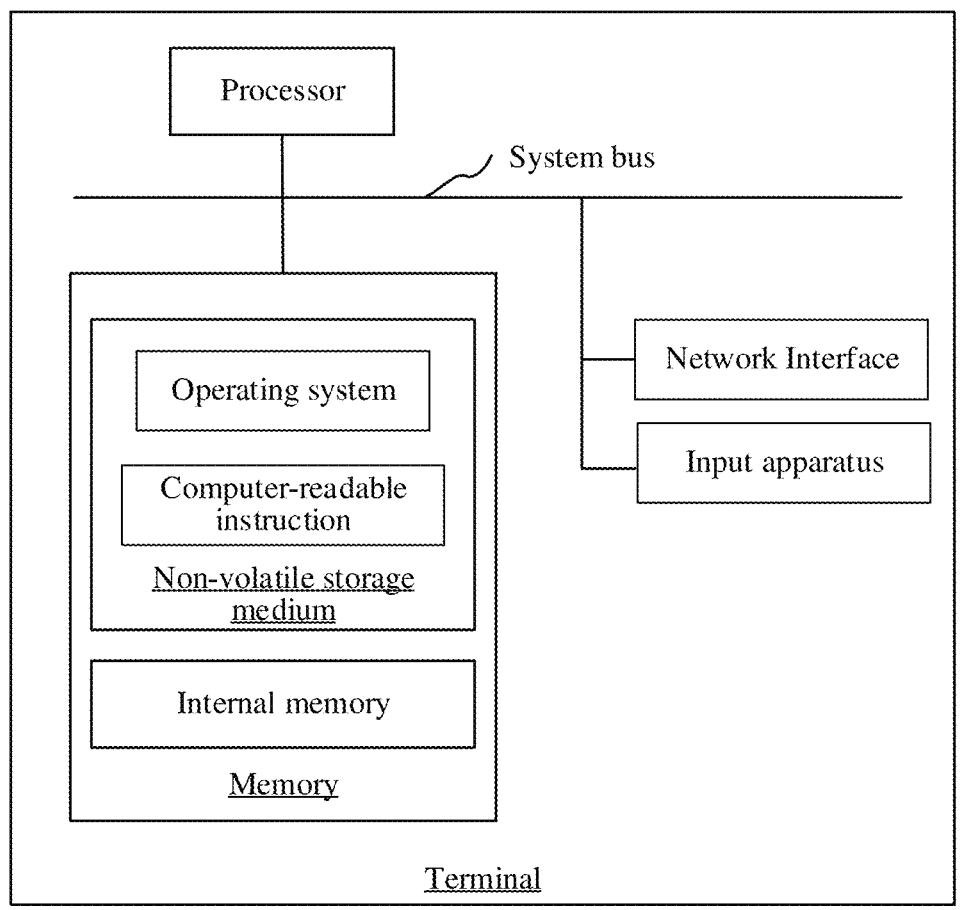
FIG. 13 is a diagram of an internal structure of a terminal according to an embodiment of this application.

FIG. 13 is a diagram of an internal structure of a terminal according to an embodiment. As shown in FIG. 13, the terminal includes a processor, a memory, a network interface, and an input apparatus that are connected by a system bus. The memory includes a non-volatile storage medium and an internal memory. The non-volatile storage medium of the terminal stores an operating system, and may further store a computer-readable instruction. The computer-readable instruction, when executed by the processor, may cause the processor to perform the method for controlling a virtual object to interact with a virtual scene. The internal memory may also store a computer-readable instruction. The computer-readable instruction, when executed by the processor, may cause the processor to implement the method for controlling a virtual object to interact with a virtual scene. The input apparatus may be a touch layer covering a display, or may be a button, a trackball, or a touch panel disposed on a housing of the computer device, or may be an external keyboard, a touch panel, or a mouse.

A person skilled in the art may understand that, in the structure shown in FIG. 13, only a block diagram of a partial structure related to a solution in this application is shown, and the structure does not constitute a limitation to the terminal to which the solution in this application is applied. Specifically, the terminal may include more components or fewer components than those shown in the figure, or some components may be combined, or a different component deployment may be used.

In an embodiment, the apparatus for controlling a virtual object to interact with a virtual scene provided in this application may be implemented in a form of computer-readable instructions, and the computer-readable instructions may run on the terminal shown in FIG. 13. The memory of the terminal may store various program modules constituting the apparatus for controlling a virtual object to interact with a virtual scene, for example, the display module 1101, the control module 1102, and the state adjustment module 1103 shown in FIG. 11. Computer-readable instructions formed by the program modules cause the processor to perform the operations in the method for controlling a virtual object to interact with a virtual scene in the embodiments of this application described in this specification.

An embodiment of this application provides a computer-readable storage medium, storing a computer-readable instruction, the computer-readable instruction being loaded and executed by a processor to perform operations performed in the method for controlling a virtual object to interact with a virtual scene according to the foregoing embodiments.

A person of ordinary skill in the art may understand that all or some of the processes of the methods in the embodiments may be implemented by a computer program instructing relevant hardware. The program may be stored in a non-volatile computer-readable storage medium. When the program runs, the processes of the methods in the embodiments are performed. Any reference to the memory, storage, a database, or other media used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM). synchronous link (Synchlink) DRAM (SLDRAM), a rambus direct RAM (RDRAM), a direct rambus dynamic RAM (DRDRAM), and a rambus dynamic RAM (DRAM).

The foregoing descriptions are merely preferred embodiments of this application, and are not intended to limit this application. Any modification, equivalent replacement, improvement and the like made within the spirit and principle of this application shall fall within the protection scope of this application.

What is claimed is:

1. A method for controlling a virtual object to interact with a virtual scene, comprising:
    displaying, by a terminal comprising a memory storing instructions and a processor in communication with the memory, a first interface of a virtual scene, the first interface comprising a virtual door in a closed state;
    controlling, by the terminal, a virtual object to move in the virtual scene and enter a first area of the virtual door, the first area being an area allowing automatic opening of the virtual door;
    in response to a moving speed of the virtual object in a vertical direction of the virtual door being greater than a preset speed, and an angle between a direction that the virtual object directly faces and a plane in which the virtual door is located being within a preset angle range, adjusting, by the terminal, the virtual door from the closed state to an open state; and
    displaying, by the terminal, a second interface of the virtual scene, the second interface comprising the virtual door in the open state.

2. The method according to claim 1, further comprising:
    in response to the virtual object entering the first area of the virtual door, displaying, by the terminal, a mode switching button of the virtual door, the mode switching button being used for switching between door opening modes, the door opening modes comprising an automatic door opening mode and a manual door opening mode, the automatic door opening mode being a mode allowing automatic opening of the virtual door, and the manual door opening mode being a mode allowing no automatic opening of the virtual door; and
    in response to detecting a selection operation on the mode switching button, switching, by the terminal, the door opening mode from a current door opening mode to the other door opening mode.

3. The method according to claim 2, wherein, in response to the moving speed of the virtual object in the vertical direction of the virtual door being greater than the preset speed, and the angle between the direction that the virtual object directly faces and the plane in which the virtual door is located being within the preset angle range, the adjusting the virtual door from the closed state to the open state comprises:
    in response to the moving speed being greater than the preset speed, the angle being within the preset angle range, and the current door opening mode being the automatic door opening mode, adjusting, by the terminal, the virtual door from the closed state to the open state.

4. The method according to claim 2, wherein in response to the virtual object entering the first area of the virtual door, the displaying the mode switching button of the virtual door comprises:
    in response to the virtual object entering the first area of the virtual door and turning on a specified button in a setting interface, displaying, by the terminal, the mode switching button of the virtual door, wherein:
        in response to the specified button being turned on, the automatic door opening mode and a permission to switch the door opening mode through the mode switching button are enabled, and
        in response to the specified button being turned off, the automatic door opening mode and the permission to switch the door opening mode through the mode switching button are disabled.

5. The method according to claim 4, further comprising:
    enabling, by the terminal during a first time period, the automatic door opening mode and the permission to switch the door opening mode through the mode switching button;
    controlling, by the terminal during a second time period, to configure the automatic door opening mode according to an state of the specified button, and switching between enabling and disabling of the permission to switch the door opening mode through the mode switching button; and
    disabling, by the terminal during a third time period, the automatic door opening mode and the permission to switch the door opening mode through the mode switching button, wherein:
        the first time period is a time period of a first preset duration after a start time point,
        the third time period is a time period of a second preset duration before an end time point, and
        the second time period is a time period between the first time period and the third time period.

6. The method according to claim 1, wherein after the displaying the first interface of the virtual scene, the method further comprises:
    controlling, by the terminal, the virtual object to move in the virtual scene and enter a second area of the virtual door, the second area being an area allowing opening of the virtual door, and the second area being greater than the first area;
    displaying, by the terminal, an opening button of the virtual door;

in response to detecting a selection operation on the opening button, adjusting, by the terminal, the virtual door from the closed state to the open state; and displaying, by the terminal, the second interface of the virtual scene, the second interface comprising the virtual door in the open state.

7. The method according to claim 6, further comprising:

obtaining, by the terminal, in a process of controlling the virtual object to move in the virtual scene, a first position of the virtual object in the virtual scene and a second position of the virtual door in the virtual scene;

in response to a distance between the first position and the second position being less than a first preset distance, determining, by the terminal, that the virtual object enters the first area of the virtual door; and in response to the distance between the first position and the second position being less than a second preset distance, determining, by the terminal, that the virtual object enters the second area of the virtual door, the second preset distance being greater than the first preset distance.

8. An apparatus for controlling a virtual object to interact with a virtual scene, comprising:

a memory storing instructions; and a processor in communication with the memory, wherein, when the processor executes the instructions, the processor is configured to cause the apparatus to:

display a first interface of a virtual scene, the first interface comprising a virtual door in a closed state, control a virtual object to move in the virtual scene and enter a first area of the virtual door, the first area being an area allowing automatic opening of the virtual door, in response to a moving speed of the virtual object in a vertical direction of the virtual door being greater than a preset speed, and an angle between a direction that the virtual object directly faces and a plane in which the virtual door is located being within a preset angle range, adjust the virtual door from the closed state to an open state, and display a second interface of the virtual scene, the second interface comprising the virtual door in the open state.

9. The apparatus according to claim 8, wherein, when the processor executes the instructions, the processor is configured to further cause the apparatus to:

in response to the virtual object entering the first area of the virtual door, display a mode switching button of the virtual door, the mode switching button being used for switching between door opening modes, the door opening modes comprising an automatic door opening mode and a manual door opening mode, the automatic door opening mode being a mode allowing automatic opening of the virtual door, and the manual door opening mode being a mode allowing no automatic opening of the virtual door; and in response to detecting a selection operation on the mode switching button, switch the door opening mode from a current door opening mode to the other door opening mode.

10. The apparatus according to claim 9, wherein, when the processor is configured to cause the apparatus to, in response to the moving speed of the virtual object in the vertical direction of the virtual door being greater than the preset speed, and the angle between the direction that the virtual object directly faces and the plane in which the virtual door is located being within the preset angle range, adjust the virtual door from the closed state to the open state, the processor is configured to cause the apparatus to:

in response to the moving speed being greater than the preset speed, the angle being within the preset angle range, and the current door opening mode being the automatic door opening mode, adjust the virtual door from the closed state to the open state.

11. The apparatus according to claim 9, wherein, when the processor is configured to cause the apparatus to, in response to the virtual object entering the first area of the virtual door, display the mode switching button of the virtual door, the processor is configured to cause the apparatus to:

in response to the virtual object entering the first area of the virtual door and turning on a specified button in a setting interface, display the mode switching button of the virtual door, wherein:

in response to the specified button being turned on, the automatic door opening mode and a permission to switch the door opening mode through the mode switching button are enabled, and in response to the specified button being turned off, the automatic door opening mode and the permission to switch the door opening mode through the mode switching button are disabled.

12. The apparatus according to claim 11, wherein, when the processor executes the instructions, the processor is configured to further cause the apparatus to:

enable, during a first time period, the automatic door opening mode and the permission to switch the door opening mode through the mode switching button;

control, during a second time period, to configure the automatic door opening mode according to an state of the specified button, and switching between enabling and disabling of the permission to switch the door opening mode through the mode switching button; and disable, during a third time period, the automatic door opening mode and the permission to switch the door opening mode through the mode switching button, wherein:

the first time period is a time period of a first preset duration after a start time point, the third time period is a time period of a second preset duration before an end time point, and the second time period is a time period between the first time period and the third time period.

13. The apparatus according to claim 8, wherein, after the processor is configured to cause the apparatus to display the first interface of the virtual scene, the processor is configured to further cause the apparatus to:

control the virtual object to move in the virtual scene and enter a second area of the virtual door, the second area being an area allowing opening of the virtual door, and the second area being greater than the first area;

display an opening button of the virtual door;

in response to detecting a selection operation on the opening button, adjust the virtual door from the closed state to the open state; and display the second interface of the virtual scene, the second interface comprising the virtual door in the open state.

14. The apparatus according to claim 13, wherein, when the processor executes the instructions, the processor is configured to further cause the apparatus to:

obtain, in a process of controlling the virtual object to move in the virtual scene, a first position of the virtual object in the virtual scene and a second position of the virtual door in the virtual scene;

in response to a distance between the first position and the second position being less than a first preset distance, determine that the virtual object enters the first area of the virtual door; and in response to the distance between the first position and the second position being less than a second preset distance, determine that the virtual object enters the second area of the virtual door, the second preset distance being greater than the first preset distance.

15. A non-transitory computer readable storage medium storing computer-readable instructions, wherein, the computer readable instructions, when executed by a processor, are configured to cause the processor to perform:

displaying a first interface of a virtual scene, the first interface comprising a virtual door in a closed state;

controlling a virtual object to move in the virtual scene and enter a first area of the virtual door, the first area being an area allowing automatic opening of the virtual door;

in response to a moving speed of the virtual object in a vertical direction of the virtual door being greater than a preset speed, and an angle between a direction that the virtual object directly faces and a plane in which the virtual door is located being within a preset angle range, adjusting the virtual door from the closed state to an open state; and displaying a second interface of the virtual scene, the second interface comprising the virtual door in the open state.

16. The non-transitory computer readable storage medium according to claim 15, wherein the computer readable instructions are configured to further cause the processor to perform:

in response to the virtual object entering the first area of the virtual door, displaying a mode switching button of the virtual door, the mode switching button being used for switching between door opening modes, the door opening modes comprising an automatic door opening mode and a manual door opening mode, the automatic door opening mode being a mode allowing automatic opening of the virtual door, and the manual door opening mode being a mode allowing no automatic opening of the virtual door; and in response to detecting a selection operation on the mode switching button, switching the door opening mode from a current door opening mode to the other door opening mode.

17. The non-transitory computer readable storage medium according to claim 16, wherein when the computer readable instructions are configured to cause the processor to perform, in response to the moving speed of the virtual object in the vertical direction of the virtual door being greater than the preset speed, and the angle between the direction that the virtual object directly faces and the plane in which the virtual door is located being within the preset angle range, adjusting the virtual door from the closed state to the open state, the computer readable instructions are configured to further cause the processor to perform:

in response to the moving speed being greater than the preset speed, the angle being within the preset angle range, and the current door opening mode being the automatic door opening mode, adjusting the virtual door from the closed state to the open state.

18. The non-transitory computer readable storage medium according to claim 16, wherein when the computer readable instructions are configured to cause the processor to perform, in response to the virtual object entering the first area of the virtual door, displaying the mode switching button of the virtual door, the computer readable instructions are configured to further cause the processor to perform:

in response to the virtual object entering the first area of the virtual door and turning on a specified button in a setting interface, displaying the mode switching button of the virtual door, wherein:

in response to the specified button being turned on, the automatic door opening mode and a permission to switch the door opening mode through the mode switching button are enabled, and in response to the specified button being turned off, the automatic door opening mode and the permission to switch the door opening mode through the mode switching button are disabled.

19. The non-transitory computer readable storage medium according to claim 18, wherein the computer readable instructions are configured to further cause the processor to perform:

enabling, during a first time period, the automatic door opening mode and the permission to switch the door opening mode through the mode switching button;

controlling, during a second time period, to configure the automatic door opening mode according to an state of the specified button, and switching between enabling and disabling of the permission to switch the door opening mode through the mode switching button; and disabling, during a third time period, the automatic door opening mode and the permission to switch the door opening mode through the mode switching button, wherein:

the first time period is a time period of a first preset duration after a start time point, the third time period is a time period of a second preset duration before an end time point, and the second time period is a time period between the first time period and the third time period.

20. The non-transitory computer readable storage medium according to claim 15, wherein after the computer readable instructions are configured to cause the processor to perform displaying the first interface of the virtual scene, the computer readable instructions are configured to further cause the processor to perform:

controlling the virtual object to move in the virtual scene and enter a second area of the virtual door, the second area being an area allowing opening of the virtual door, and the second area being greater than the first area;

displaying an opening button of the virtual door;

in response to detecting a selection operation on the opening button, adjusting the virtual door from the closed state to the open state; and displaying the second interface of the virtual scene, the second interface comprising the virtual door in the open state.

* * * * *